(12) United States Patent
O'Keefe

(10) Patent No.: US 11,044,163 B2
(45) Date of Patent: Jun. 22, 2021

(54) METHODS, SYSTEMS AND COMPUTER PROGRAM PRODUCTS FOR IDENTIFYING ENDPOINTS IN A NETWORK

(71) Applicant: Sensus Spectrum, LLC, Morrisville, NC (US)

(72) Inventor: Brian O'Keefe, Cary, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 4 days.

(21) Appl. No.: 16/101,950

(22) Filed: Aug. 13, 2018

(65) Prior Publication Data

US 2019/0052536 A1 Feb. 14, 2019

Related U.S. Application Data

(60) Provisional application No. 62/545,072, filed on Aug. 14, 2017.

(51) Int. Cl.
| | | |
|---|---|---|
| *H04L 12/24* | (2006.01) | |
| *H04W 64/00* | (2009.01) | |
| *H04L 12/751* | (2013.01) | |
| *H04L 29/08* | (2006.01) | |

(52) U.S. Cl.
CPC .......... *H04L 41/12* (2013.01); *H04L 41/0853* (2013.01); *H04L 45/02* (2013.01); *H04L 67/1042* (2013.01); *H04L 67/1061* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 7,706,745 B2 | 4/2010 | Sanderford, Jr. et al. | |
| 8,769,461 B1 * | 7/2014 | Li .......................... | G06F 30/34 716/114 |
| 9,330,053 B1 * | 5/2016 | Bertz ................ | G06F 15/17306 |

(Continued)

FOREIGN PATENT DOCUMENTS

| | | | |
|---|---|---|---|
| JP | 2012-244208 | * | 12/2012 |
| WO | WO 2012/108544 A1 | | 8/2012 |
| WO | WO 2015/027373 A1 | | 3/2015 |

OTHER PUBLICATIONS

Notification of Transmittal of the International Search Report and the Written Opinion of the International Searching Authority, or the Declaration, PCT/US2018/046448, dated Nov. 12, 2018, 11 pages.

(Continued)

*Primary Examiner* — Jay L Vogel
(74) *Attorney, Agent, or Firm* — Stanek Lemon Crouse & Meeks, PA

(57) ABSTRACT

Methods for identifying in range endpoints in a network are provided. The methods includes providing a map including endpoints in the network, the endpoints including target endpoints, out of range endpoints and non-out of range endpoints; positioning a grid over the map including the endpoints in the network, the grid including a plurality of subsections each having a defined radius, locating a target endpoint on the map and in one of the subsections of the grid; and identifying a plurality of endpoints within subsections of the grid within a defined range of the target endpoint.

19 Claims, 6 Drawing Sheets

(56) References Cited

U.S. PATENT DOCUMENTS

| | | | | |
|---|---|---|---|---|
| 2007/0218891 A1* | 9/2007 | Cox | ................... | G01C 21/20 |
| | | | | 455/422.1 |
| 2008/0186902 A1* | 8/2008 | Furukoshi | ............. | H04W 16/00 |
| | | | | 370/315 |
| 2012/0051239 A1* | 3/2012 | Thai | ................... | H04K 3/224 |
| | | | | 370/252 |
| 2013/0294228 A1* | 11/2013 | Ahuja | ................. | H04L 41/0654 |
| | | | | 370/228 |
| 2015/0036532 A1* | 2/2015 | Osterloh | ............... | H04L 43/045 |
| | | | | 370/252 |
| 2015/0171953 A1* | 6/2015 | Djukic | ............... | H04W 40/205 |
| | | | | 370/252 |
| 2015/0304879 A1* | 10/2015 | Dacosta | ................ | H04W 4/14 |
| | | | | 370/235 |
| 2017/0295468 A1* | 10/2017 | Snyder | ................ | H04W 4/029 |
| 2018/0035401 A1* | 2/2018 | Iijima | ................... | H04W 16/18 |

OTHER PUBLICATIONS

Terzija et al., "FlexNet wide area monitoring system," 2011 IEEE Power and Energy Society General Meeting, Jul. 24, 2011, pp. 1-7.

* cited by examiner

METHODS, SYSTEMS AND COMPUTER PROGRAM PRODUCTS FOR IDENTIFYING ENDPOINTS IN A NETWORK

CLAIM OF PRIORITY

The present application claims priority to U.S. Provisional Application No. 62/545,072, filed on Aug. 14, 2017, the content of which is hereby incorporated herein by reference as if set forth in its entirety.

FIELD

The present inventive concept relates generally to networks, more particularly, to networks including smart devices and systems and methods for communicating with out of range devices therein.

BACKGROUND

Smart meters and sensors communicate over a network, for example, the FlexNet® communication network. The network allows secure transmission and reception of data, for example, customer usage data. This data can be used to proactively manage electric, water and gas systems. The two-way network enables data to be collected, delivered, managed and analyzed in real time and as often as possible.

The networks are constantly updating the devices (endpoints) that communicate within the network. As used herein an "endpoint", refers to any non-transceiver tower device operating in the network, for example, any type of smart meter, gas, heat or electric. When an endpoint that is out of range of a transceiver, hereinafter, an out of range device (ORD), it communicates through another endpoint, or buddy device. The buddy device (non-ORD) may be a peer device or may be a device configured to receive and/or relay a transmission.

Buddy devices (non-ORDs) are generally discovered within the network for each ORD. Currently, a search algorithm may be applied to the set of endpoints comprising a network in an attempt to identify candidate (possible) buddy devices (endpoints) for all out of range devices (ORDs) in the system. Thus, as illustrated in FIG. 1, all endpoints (non-ORDs) within a radius R from the target endpoint X (ORD) are located in each of the areas A, B, C and D. The radius R can be any distance set by the operator, for example, one (1) mile. The endpoints in area A may be ignored in some scenarios as they are deemed too close to the target X to provide anything additional. The endpoints in each area A, B, C and D having the strongest signals, or signals over a particular threshold, are identified out to the radius R. Thus, currently searching for non-ORDs within a configurable radius R of the ORD (X) requires computing a distance from every identified ORD to every non-ORD. Storing the distances generally requires $O(n^2)$ space (where n is the number of endpoints in the network). These distances are computed each time and takes about $O(n^2)$ time. For a large input data set, for example, four million endpoints, this process required may take approximately two full days to complete. An improved method of locating non-ORDs in a network is desired.

SUMMARY

Some embodiments of the present inventive concept provide a method for identifying in range endpoints in a network, the method including providing a map including endpoints in the network, the endpoints including target endpoints, out of range endpoints and non-out of range endpoints; positioning a grid over the map including the endpoints in the network, the grid including a plurality of subsections each having a defined radius, locating a target endpoint on the map and in one of the subsections of the grid; and identifying a plurality of endpoints within subsections of the grid within a defined range of the target endpoint.

In further embodiments, each of the plurality of subsections may be hexagons. Identifying the plurality of endpoints may further include identifying the plurality of endpoints within the hexagons within the defined range of the target endpoint. In certain embodiments, the defined radius may be about 800 meters and the defined range may be two times the defined radius or 1600 meters.

In still further embodiments, providing the map may include using a projection program to project endpoints onto a-map using latitude and longitude coordinates associated with each of the endpoints, and the map including the endpoints may be stored. In certain embodiments, the map including the endpoints in the network may be periodically regenerated using the projection program to provide an updated map and the updated map may be stored.

In some embodiments, the defined range may be a multiple of the defined radius.

In further embodiments, the endpoints in the network may be any non-transceiver tower device operating in the network. For example, the endpoints in the network may be smart devices, such as smart meters.

Related system and computer program product claims are also provided herein.

DETAILED DESCRIPTION

Figure 1:
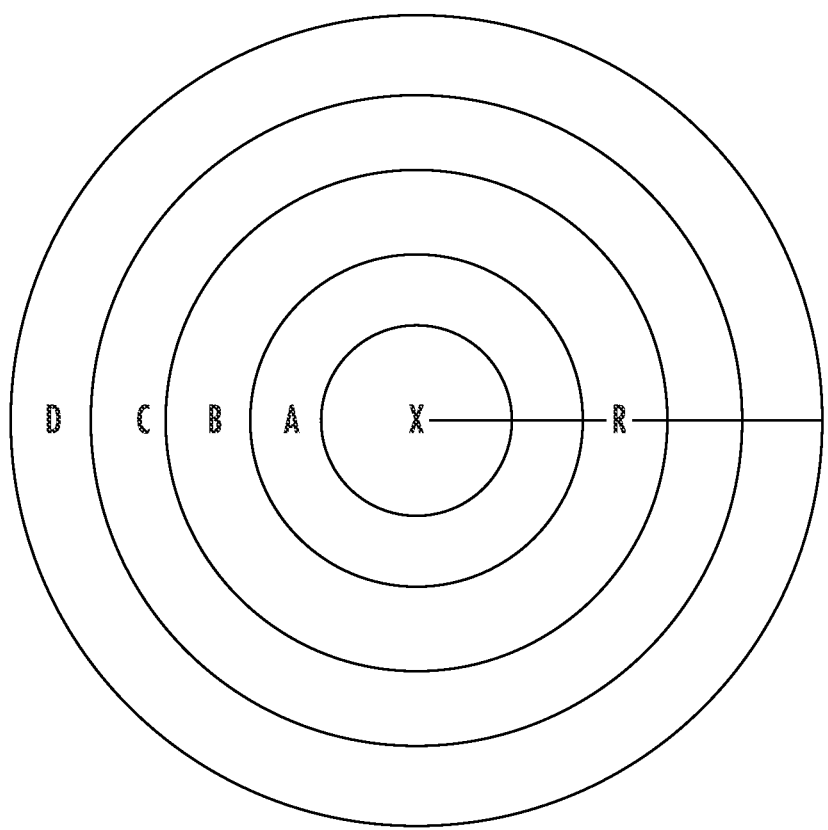
FIG. 1 is a block diagram illustrating location of non-Out of Range Devices (ORDs) in a conventional system.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is tom cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As used herein an "endpoint", refers to any non-transceiver tower device operating in the network, for example, any type of smart meter, gas, heat or electric. When an endpoint that is out of range of a transceiver, hereinafter, an out of range device (ORD), it communicates through another endpoint, or buddy device. The buddy device (non-ORD) may be a peer device or may be a device configured to receive and/or relay a transmission. As further used herein, "n" refers to the number of endpoints in the network.

As discussed above, improved methods for identifying non-ORDs within a specified radius R of an ORD are needed. Currently, the length of time it takes to identify the non-ORDs using conventional methods is extremely long. Accordingly, embodiments of the present inventive concept provide methods and systems for reducing the amount of time spent locating the non-ORD endpoints in a network. In particular, some embodiments of the present inventive concept reduce the search space for endpoints (non-ORDs) that are "nearby" (within a particular radius) of a particular other endpoint (ORD). As will be discussed further below with respect to FIGS. 2 through 6, embodiments of the present inventive concept project geospatial coordinates from a latitude and longitude on to a hexagonal grid. A first order approximation of distance can be made based on the size of the hexagons chosen. The size of the hexagon is arbitrary and, therefore, customizable, but is fixed once it is chosen. Embodiments of the present inventive concept reduce the time complexity of the "nearby" search from $O(n^2)$ to $O(n \log n)$, and the actual time from two days to about 20 minutes for 4 million endpoints.

It will be understood that the estimated time changes based on the number of endpoints included in the process. It will be further understood that although embodiments of the present inventive concept are discussed with respect to ORDs and non-ORDs (buddy devices), embodiments of the present inventive concept are not limited to this configuration. For example, embodiments of the present inventive concept may be used to determine presence of any type of endpoints without departing from the scope of the present inventive concept.

Embodiments of the present inventive concept are discussed herein using "big O" notation. For example, as discussed above, embodiments of the present inventive concept reduce the time complexity of the "nearby" search from $O(n^2)$ to $O(n \log n)$, and the actual time from two days to about 20 minutes for 4 million endpoints. The "big O" notation is used to describe the performance or complexity of an algorithm. Big O specifically describes the worst-case scenario, and can be used to describe the execution time required or the space used (e.g. in memory or on disk) by an algorithm. In other words, "big O" is a theoretical measure of the execution of an algorithm, usually the time or memory needed, given the problem size n, which is usually the number of items (endpoints). Informally, saying some equation $f(n)=O(g(n))$ means it is less than some constant multiple of $g(n)$. The notation is read, "f of n is big oh of g of n".

Figure 2:
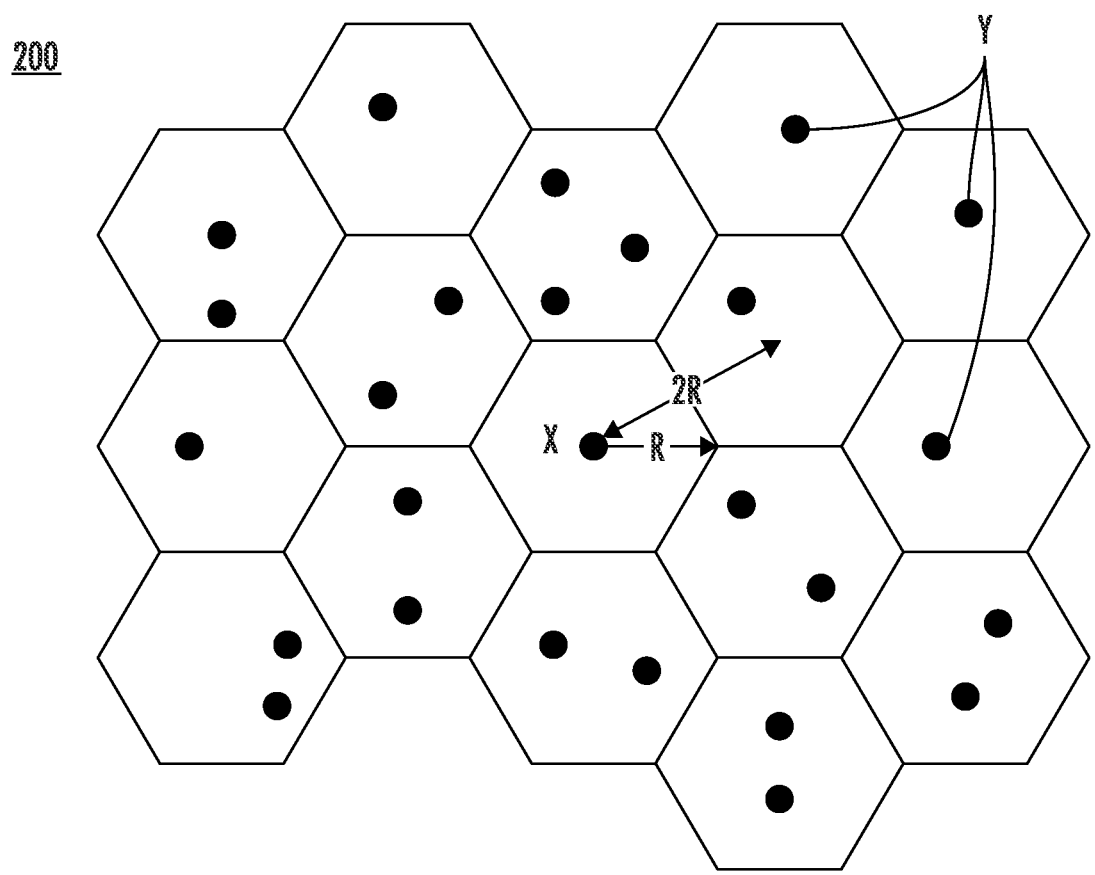
FIG. 2 is a block diagram illustrating a hexagonal grid used to identify non-ORDs in a network in accordance with some embodiments of the present inventive concept.

Referring now to FIG. 2, a hexagon grid generated in accordance with some embodiments of the present inventive concept will be discussed. First, a projection program, such as Web Mercator, is used to project the endpoints on a map using latitude and longitude coordinates of the endpoints. Then, the resulting projection created using the projection program is projected onto a hexagonal grid 200 as illustrated in FIG. 2. In other words, the positions of the various endpoints, for example, ORDs and non-ORDS, are projected onto a map using a projection program and then a hexagonal grid can be positioned (superimposed) over the projection. In some embodiments, the hexagons have a radius R of about 800 meters, thus, 2R being 1600 meters, which is approximately 1 mile. It will be understood that the radius R can be chosen to be any distance without departing from the scope of the present inventive concept.

Projecting every endpoint into its corresponding hexagon can be done in $O(n)$ time. Since the positions of the endpoint are generally static, the projection is computed once and stored in $O(n)$ space for use. It is understood that endpoints can be added or removed from a network at any time. Thus, the projection may be recalculated periodically and restored to make sure the most up to date projection is being used.

Using the stored projections and the hexagonal grid, instead of using $O(n^2)$ time to choose candidate buddy devices for an ORD by searching all non-ORDs, the time can be reduced to about $O(n \log n)$ by searching only the hexagon containing the particular ORD you are interested in plus the ring of hexagons surrounding it. Using the hexagon in which the ORD sits and the surrounding hexagons allows a grid with a radius of one (1) mile to be covered if the radius R of the hexagon is 800 meters. As discussed above, the radius R is configurable and, therefore, not limited to a mile or 800 meters. Some embodiments of the present inventive concept are configured to compute the number of surrounding rings of hexagons needed to cover the particular distance chosen.

It will be understood that although embodiments of the present inventive concept are discussed herein as including a grid having a plurality of hexagonal subsections, embodiments of the present inventive concept are not limited to this configuration. The subsections of the grid may have any shape that lends itself to embodiments discussed herein without departing from the scope of the present inventive concept.

Referring now to FIG. 2, an example of using a hexagon grid in accordance with some embodiments of the present inventive concept will be discussed. As illustrated in FIG. 2, a projection includes a series of possible buddy devices (endpoints) Y (non-ORDs) and a target endpoint X (ORD) and this projection is saved. A buddy device (non-ORD) may be a peer device or may be a device configured to receive and/or relay a transmission. Any two-way device in the wireless network may be capable of autonomously acting as a buddy device while carrying out its normal sensing functions.

Referring again to FIG. 2, the hexagonal grid 200 is overlaid on the stored projection such that the target endpoint X is within a hexagon. Although the target endpoint X is illustrated as being in the center of the hexagon in FIG. 2, it will be understood that the target endpoint X does not have to be in the center of a hexagon on the grid 200. The hexagon in which the target endpoint X sits and the surrounding hexagons will be used to locate candidate buddies Y for the endpoint X. The relevant hexagons in FIG. 2 are shaded. Thus, the endpoints Y (non-ORDs) in each of the shaded hexagons are possible candidate buddies in accordance with embodiments discussed herein.

In some embodiments, rather than visiting every endpoint Y (ORD) within a given hexagon, coverage may be approximated as if all endpoints Y (ORDs) are located at a center of the hexagon. Candidate buddies may be chosen based on the approximated information. In these embodiments, time may be reduced to approximately O(log n) while still covering all endpoints Y (ORDs). However, there may be a tradeoff of reduced quality of the ORD to buddy path.

Figure 3:
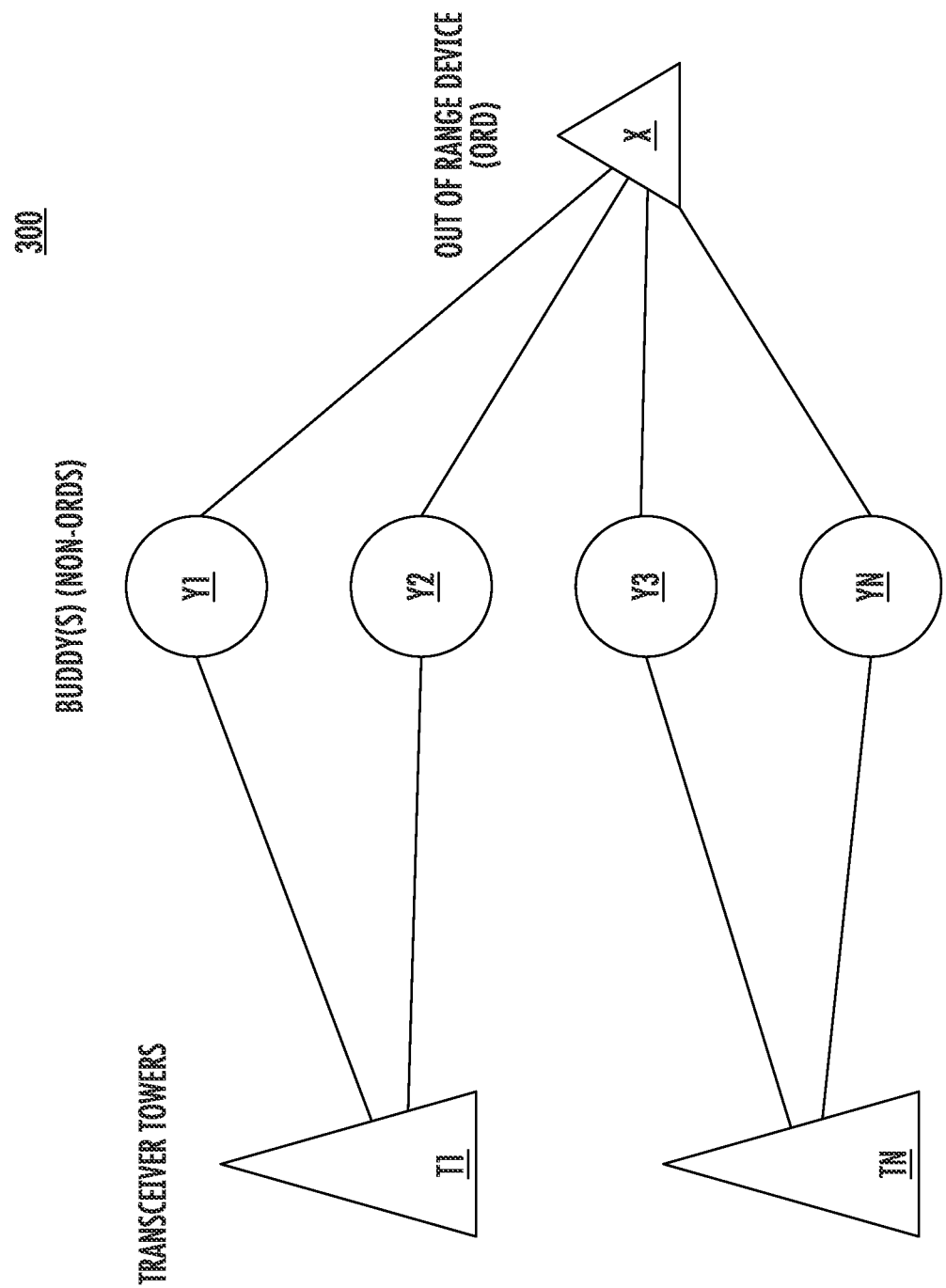
FIG. 3 is a block diagram of an example network including ORDs and non-ORDs in accordance with some embodiments of the present inventive concept.

Referring now to FIG. 3, a block diagram of an example network including ORDs and non-ORDs in accordance with embodiments discussed herein will be discussed. As illustrated in FIG. 3, the network 300 includes transceiver towers T1 and TN, candidate buddy devices Y1, Y2, Y3 and YN and an ORD X. It will be understood that there may be more or less transceivers, candidate buddy devices and ORDs than illustrated in FIG. 3 without departing from the scope of the present inventive concept.

As shown in FIG. 3, an ORD sends a message that is received by one or more buddies (Y1-YN) which are 2-way endpoints. The 2-way endpoints, re-transmit the ORD's message to a transceiver, a collector tower or other collector T1-TN. Thus, the ORD can use the non-ORDs (buddies) to communicate with the transceiver towers. Embodiments of the present inventive concept allow identification of non-ORDs for each ORD extremely efficient using a hexagon grid as briefly discussed above.

Figure 4:
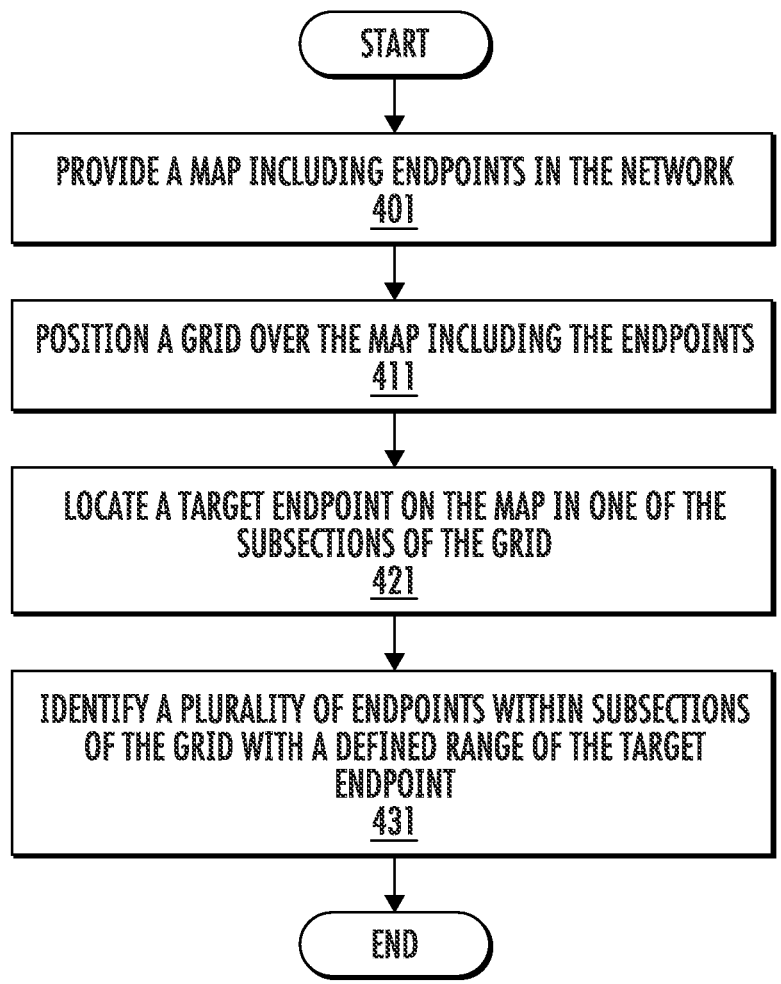
FIG. 4 is a flowchart illustrating operations in accordance with some embodiments of the present inventive concept.

Referring now to FIG. 4, a flowchart illustrating operations identifying in range endpoints in a network will be discussed. As illustrated in FIG. 4, operations begin at block 401 by providing a map including endpoints in the network. The endpoints may include target endpoints, out of range endpoints and non-out of range endpoints. In some embodiments, providing the map includes using a projection program to project endpoints onto a map using latitude and longitude coordinates associated with each of the endpoints and storing the map including the endpoints. Since endpoints are constantly being added and removed from the network, the map may be periodically regenerated including the endpoints in the network using the projection program to provide an updated map and the updated map may be stored.

Endpoints in the network may include any non-transceiver tower device operating in the network. In some embodiments, endpoints in the network are smart devices, for example, smart meters.

Operations continue at block 411 by positioning a grid over the map including the endpoints in the network and a target endpoint is located on the map and in one of the subsections of the grid (block 421). The grid includes a plurality of subsections each having a defined radius. In some embodiments, each of the plurality of subsections are hexagons as discussed above. Thus, the plurality of endpoints may be identified by locating endpoints within the hexagons within the defined range of the target endpoint. In some embodiments, the defined radius may be about 800 meters the defined range may two times the defined radius or 1600 meters. However, it will be understood that embodiments of the present inventive concept are not limited to this configuration.

A plurality of endpoints may be defined within subsections of the grid within a defined range of the target endpoint (block 431). In other words, as discussed above, in embodiments having hexagon shaped subsections, all endpoints within a subsection within two times the radius of the subsection are identified as in range endpoints for use in transmission to and from the target device.

Although embodiments of the present inventive concept are discussed above with respect to a buddy-ORD communication model, embodiments of the present inventive concept are not limited to this configuration. For example, embodiments of the present inventive concept may be used in combination with other types of networks, such as a mesh network. In other words, rather than ORDs and non-ORDs, embodiments discussed herein could be generalized to choose either a first-hop candidate or the next-hop candidate rather than a buddy candidate.

Figure 5:
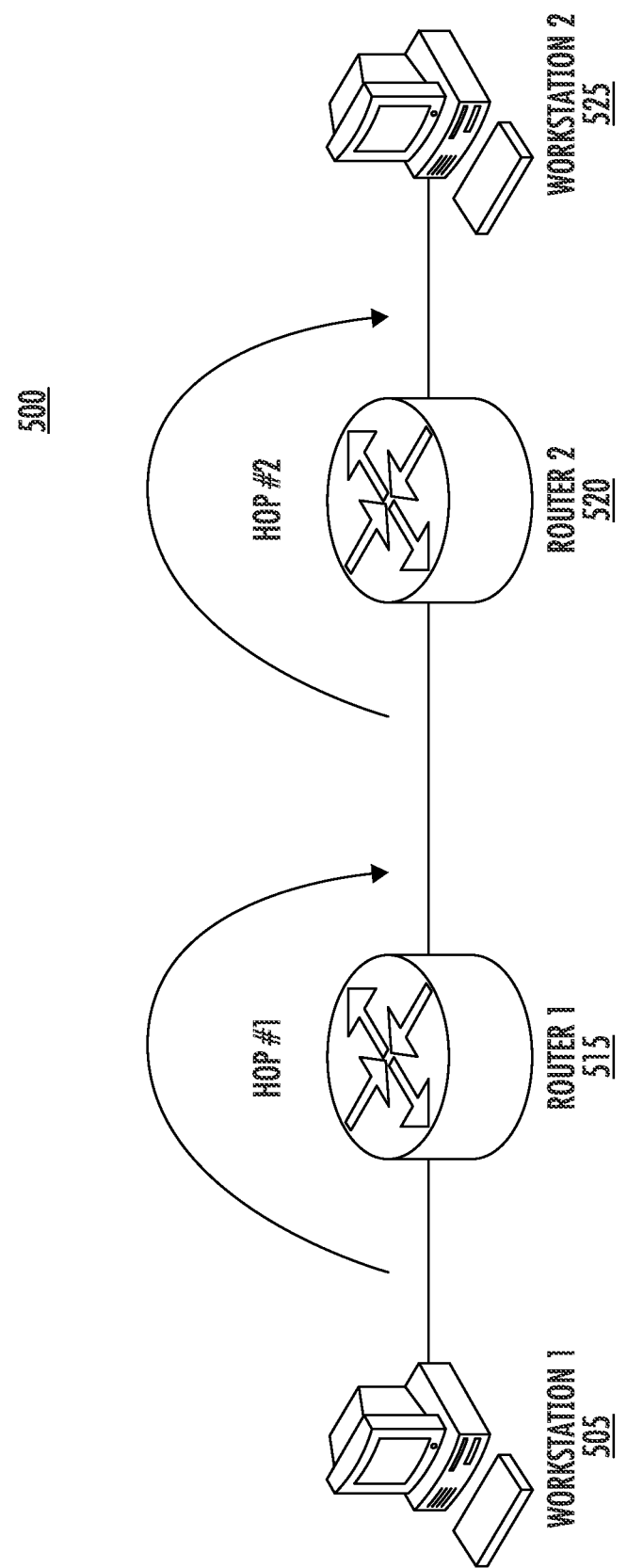
FIG. 5 is a basic block diagram of a network including hubs in accordance with some embodiments of the present inventive concept.

As illustrated in FIG. 5, a hop is a computer networking term that refers to the number of other devices, for example, routers that a packet passes through from its source device 505 (workstation 1) to its destination device 525 (workstation 2). In some embodiments, a "hop" is counted when a packet passes through other hardware on a network (besides routers 515 and 520), like switches, access points, repeaters and the like. In FIG. 5, the packet traverses two hops (two routers) before reaching its destination 525, workstation 2.

Applying embodiments discussed here to a network similar to the network of FIG. 5, using the mesh network example, one or more devices in the hexagon may be chosen to act as a "hub" for the other devices (the first-hop variant), and the hub may be responsible for relaying to adjacent hexagons. The next hop would be to an endpoint in a hexagon closer to the intended destination.

Figure 6:
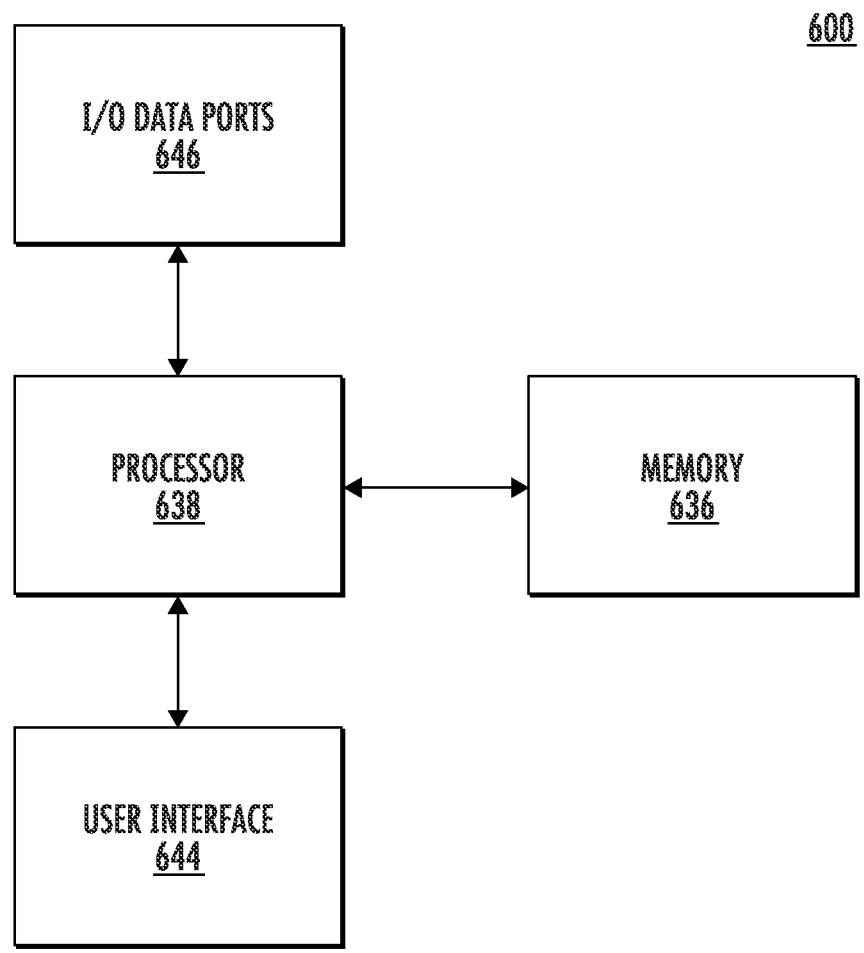
FIG. 6 is a basic block diagram of a data processing system for use in accordance with some embodiments of the present inventive concept.

As discussed above, embodiments of the present inventive concept a projection program is used to project endpoints on a map, which is used to create the hexagonal grid. Thus, some sort of data processing is needed to create and store the data. FIG. 6 is a block diagram of an example of a data processing system 600 suitable for use in the systems in accordance with embodiments of the present inventive concept. The data processing may take place in any of the devices (or all of the devices) in the system without departing from the scope of the present inventive concept. As illustrated in FIG. 6, the data processing system 600 includes a user interface 644 such as a keyboard, keypad, touchpad, voice activation circuit or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein.

As will be appreciated by one of skill in the art, embodiments of the present inventive concept may be embodied as a method, system, data processing system, or computer program product. Accordingly, the present inventive concept may take the form of an embodiment combining software and hardware aspects, all generally referred to herein as a "circuit" or "module." Furthermore, the present inventive concept may take the form of a computer program product on a non-transitory computer usable storage medium having computer usable program code embodied in the medium. Any suitable computer readable medium may be utilized including hard disks, CD ROMs, optical storage devices, or other electronic storage devices.

Computer program code for carrying out operations of the present inventive concept may be written in an object oriented programming language such as Matlab, Mathematica, Java, Smalltalk, C or C++. However, the computer program code for carrying out operations of the present inventive concept may also be written in conventional procedural programming languages, such as the "C" programming language or in a visually oriented programming environment, such as Visual Basic.

Certain of the program code may execute entirely on one or more of a user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part with reference to flowchart illustrations and/or block diagrams of methods, devices, systems, computer program products and data and/or system architecture structures according to embodiments of the inventive concept. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the drawings and specification, there have been disclosed example embodiments of the inventive concept. Although specific terms are employed, they are used in a generic and descriptive sense only and not for purposes of limitation, the scope of the inventive concept being defined by the following claims.

What is claimed is:

1. A method for identifying in range endpoints in a network at a transceiver device, the method comprising: projecting, by the transceiver device, a map, the map including endpoints in the network; positioning, by the transceiver device, a hexagonal grid over the projected map including the endpoints in the network, the hexagonal grid including a plurality of hexagonal subsections each having a defined radius R; selecting, by the transceiver device, a target endpoint in one of the hexagonal subsections of the grid, the target endpoint being out of range of the transceiver device; identifying, by the transceiver device, a plurality of non-out of range endpoints within subsections of the hexagonal grid within a defined range of the target endpoint on the map, the defined range of the target endpoint being two times the defined radius R (2R) and the plurality of non-out of range endpoints being within range of the transceiver device that is out of range of the target endpoint; and communicating, by the transceiver device, messages to and from the target endpoint wherein the messages are received at the one of the plurality of non-out of range endpoints and retransmitted from the one of the plurality of non-out of range endpoints, wherein at least one of the projecting, positioning, selecting, identifying and communicating are performed by at least one processor of the transceiver device.

2. The method of claim 1: wherein communicating further comprises communicating messages to the target endpoint from the transceiver device and from the target endpoint to the transceiver device by receiving the messages at the one of the plurality of non-out of range endpoints and retransmitting the messages from the one of the plurality of non-out of range endpoints to one of the target endpoint and/or transceiver device.

3. The method of claim 2: wherein the defined radius is 800 meters; and wherein the defined range is two times the defined radius or 1600 meters.

4. The method of claim 1, wherein protecting the map comprises projecting the map using a projection program using latitude and longitude coordinates associated with each of the endpoints, the method further comprising storing the map including the endpoints in a memory associated with the at least one processor.

5. The method of claim 4, further comprising: periodically regenerating the map including the endpoints in the network using the projection program to provide an updated map; and storing the updated map in the memory associated with the at least one processor.

6. The method of claim 1, further comprising reducing a time for identifying the plurality of non-out of range endpoints from $O(n^2)$ to $O(n \log n)$, wherein n is a number of endpoints.

7. The method of claim 1, wherein the endpoints in the network comprise any non-transceiver tower device operating in the network.

8. The method of claim 7, wherein the endpoints in the network are smart devices.

9. The method of claim 8, wherein the smart devices are smart meters comprising one or more of an electric meter, a gas meter and a water meter.

10. A system for identifying in range endpoints in a network, the system comprising a plurality of endpoints and a transceiver device with a processor that: projects a map, the map including endpoints in the network; positions a hexagonal grid over the projected map including the endpoints in the network, the hexagonal grid including a plurality of hexagonal subsections each having a defined radius R; selects a target endpoint in one of the hexagonal subsections of the grid, the target endpoint being out of range of the transceiver device in the network; and identifies a plurality of non-out of range endpoints within subsections of the hexagonal grid within a defined range of the target endpoint on the map, the defined range of the target endpoint being two times the defined radius R (2R) and the plurality of non-out of range endpoints being within range of the transceiver device that is out of range of the target endpoint; and communicates messages to and from the target endpoint, wherein the messages are received at the one of the plurality of non-out of range endpoints and retransmitted from the one of the plurality of non-out of range endpoints.

11. The system of claim 10: wherein the processor further communicates messages to the target endpoint from the transceiver device and from the target endpoint to the transceiver device by receiving the messages at the one of the plurality of non-out of range endpoints and retransmitting the messages from the one of the plurality of non-out of range endpoints to one of the target endpoint and/or transceiver device.

12. The system of claim 11, wherein the defined radius is 800 meters; and wherein the defined range is two times the defined radius or 1800 meters.

13. The system of claim 10, wherein the processor further projects the map using a projection program to project endpoints onto a map using latitude and longitude coordinates associated with each of the endpoints and store the map including the endpoints in a memory associated with the processor.

14. The system of claim 13, wherein the processor further periodically regenerates the map including the endpoints in the network using the projection program to provide an updated map; and stores the updated map in the memory associated with the processor.

15. The system of claim 10, further comprising reducing a time for identifying the plurality of non-out of range endpoints from $O(n^2)$ to $O(n \log n)$, wherein n is a number of endpoints.

16. The system of claim 10, wherein the endpoints in the network comprise any non-transceiver tower device operating in the network.

17. The system of claim 16, wherein the endpoints in the network are smart devices.

18. The system of claim 17, wherein the smart devices are smart meters comprising one or more of a gas meter, an electric meter and a water meter.

19. A computer program product for identifying in range endpoints in a network, the computer program product comprising: a non-transitory computer readable storage medium having computer readable program code embodied in said medium within a transceiver device, the computer readable program code comprising: computer readable program code to project a map, the map including endpoints in the network; computer readable program code to position a hexagonal grid over the projected map including the endpoints in the network, the grid including a plurality of hexagonal subsections each having a defined radius R; computer readable program code to select a target endpoint in one of the hexagonal subsections of the grid, the target endpoint being out of range of the transceiver device in the network; computer readable program code to identify a plurality of non-out of range endpoints within subsections of the grid within a defined range of the target endpoint on the map, the defined range of the target endpoint being two times the defined radius R (2R) and the plurality of non-out of range endpoints being within range of the transceiver device that is out of range of the target endpoint; and computer readable program code configured to communicate messages to and from the target endpoint wherein the messages are received at the one of the plurality of non-out of range endpoints and retransmitted from the one of the plurality of non-out of range endpoints.

\* \* \* \* \*

UNITED STATES PATENT AND TRADEMARK OFFICE
CERTIFICATE OF CORRECTION

| | | |
|---|---|---|
| PATENT NO. | : 11,044,163 B2 | Page 1 of 1 |
| APPLICATION NO. | : 16/101950 | |
| DATED | : June 22, 2021 | |
| INVENTOR(S) | : Brian O'Keefe | |

It is certified that error appears in the above-identified patent and that said Letters Patent is hereby corrected as shown below:

In the Specification

Column 2, Line 67: Please correct "tom cover" to read -- to cover --

In the Claims

Column 9, Claim 12, Line 39: Please correct "1800 meters" to read -- 1600 meters --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*